(12) United States Patent
Iida (10) Patent No.: US 6,233,363 B1
(45) Date of Patent: May 15, 2001

(54) IMAGE READING APPARATUS FOR A DOCUMENT PLACED FACE UP HAVING A FUNCTION OF ERASING FINGER AREA IMAGES (75) Inventor: Kentaro Iida, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/159,022

(22) Filed: Sep. 23, 1998

(30) Foreign Application Priority Data

Sep. 26, 1997 (JP) .................................... 9-262114

(51) Int. Cl.[7] ................ G06T 5/50; G06T 7/60; G06K 9/34; G06K 9/50; H04N 1/40
(52) U.S. Cl. .................. 382/274; 382/199; 382/176; 382/203; 382/319; 358/461; 358/464
(58) Field of Search ................... 358/461, 462, 358/464; 382/199, 203, 124, 274, 275, 312, 319, 195, 174, 176

(56) References Cited

U.S. PATENT DOCUMENTS

| | | | |
|---|---|---|---|
| 4,435,836 | * 3/1984 | Rubin | 382/202 |
| 5,048,096 | * 9/1991 | Beato | 382/176 |
| 5,377,019 | 12/1994 | Okisu et al. | 358/464 |
| 5,608,547 | * 3/1997 | Nakatani et al. | 358/505 |
| 5,677,776 | 10/1997 | Matsuda et al. | 358/475 |
| 5,841,903 | * 11/1998 | Kikuchi | 382/203 |
| 5,969,795 | * 10/1999 | Honda | 355/25 |
| 6,001,635 | * 1/2000 | Bungo et al. | 358/488 |

* cited by examiner

Primary Examiner—Scott Rogers
(74) Attorney, Agent, or Firm—Sidley & Austin (57) ABSTRACT

An image reading apparatus reads out images from above a document table on which a document is placed face up, wherein the apparatus detects pixels which compose a letter lying into a shadow of a finger in a finger area from a finger boundary, by starting at letter-brightness pixels on the finger boundary, and repeatedly linking the letter-brightness pixels with letter-brightness pixels in close to the above-detected letter-brightness pixels, thereby the apparatus erases an area other than the pixels composing the letter out of the finger area. This construction makes it possible to precisely erase an image of the finger area in the image erasure operation for the finger area, and besides prevent the letter image lying into the shadow of the finger in the finger area from being erased.

16 Claims, 6 Drawing Sheets

☐ PIXELS IN GROUND AREA
▨ PIXELS ON BOUNDARY OF FINGER
◳ PIXELS IN FINGER AREA
▦ ENLARGEMENT-TARGET PIXELS
■ PIXELS IN LETTER AREA

IMAGE READING APPARATUS FOR A DOCUMENT PLACED FACE UP HAVING A FUNCTION OF ERASING FINGER AREA IMAGES

This application is based on Patent Application No. 92-62114 filed in Japan, the contents of which are hereby incorporated by reference.

BACKGROUND OF THE INVENTION

This invention relates to an image reading apparatus for photographing a document such as a book which is placed face up, and especially to an art for reading out an image of the document with accuracy.

Conventionally, as to the image reading apparatus for the document placed face up, there has been provided an apparatus which detects an image including both of a finger pressing the document and the finger shadow (the image of this kind is hereinafter referred to as finger area) out of an image which is read out by an image reading sensor based on a brightness difference between a brightness of a document ground and a brightness of a finger area, and erases the finger area from the read-out image (e.g., refer to U.S. Pat. No. 5,377,019). On the other hand, there has also been provided an apparatus which detects marginal spaces in right and left edges of the document (blank area other than the area having letters and photographs, or other than the finger area), and erases an image outside the marginal spaces from a read-out image, thereby erases the image of the finger area which is normally positioned outside the marginal spaces (e.g., refer to U.S. Pat. No. 5,677,776)

However, in the above-mentioned conventional image reading apparatus, there has been a problem that a letter image lying into a finger shadow of the finger area is erroneously erased in the image erasure operation for the finger area since such a letter image cannot be distinguished and isolated from the finger area.

SUMMARY OF THE INVENTION

This invention is made to solve the above-mentioned problem. One object of the present invention is to provide an image reading apparatus in which an image of the finger area is precisely erased in the image erasure operation for the finger area, and in which the letter image lying into the finger shadow of the finger area is prevented from being erased.

In order to achieve the above-mentioned object, in accordance with the present invention, an image reading apparatus for reading out images from above a document table upon which a document is placed in a state that a surface having an image to be read out faces upward, said image reading apparatus comprises: a reading unit which reads out the image of the document to obtain image data; and, a processor which carries out processing of: detecting a finger area which corresponds with a finger and a shadow of the finger on the document, out of the image data which is obtained by said reading unit; detecting pixels on a boundary of the above-detected finger area; detecting pixels having brightness which corresponds with a letter from among the above-detected pixels on the boundary of the finger area; detecting a group of the pixels which corresponds with the letter in the finger area by starting at the above-detected pixels which correspond with the letter, and repeatedly linking the above-detected pixels with pixels having brightness which corresponds with the letter from among pixels in close to the above-detected pixels in the finger area; and, subjecting the image data which is obtained by said reading unit to a processing for erasing the finger area except the above-detected group of the pixels.

Also, in accordance with the present invention, a method of a data processing in an image reading apparatus for reading out images from above a document table upon which a document is placed in a state that a surface having an image to be read out faces upward, said method of a data processing comprises: (1) a step of obtaining image data by reading out an image of the document; (2) a step of detecting a finger area which corresponds with a finger and a shadow of the finger on the document out of the image data which is obtained in the step (1); (3) a step of detecting pixels on a boundary of the finger area which is detected in the step (2); (4) a step of detecting pixels having brightness which corresponds with a letter from among the pixels on the boundary of the finger area which are detected in the step (3); (5) a step of detecting a group of the pixels which corresponds with the letter in the finger area by starting at the pixels detected in the step (4) which correspond with the letter, and repeatedly linking the above-detected pixels with pixels having brightness which corresponds with the letter from among pixels in close to the above-detected pixels in the finger area; (6) a step of obtaining image data by reading out the image of the document once more; and, (7) a step of subjecting the image data which is obtained in the step (6) to a processing for erasing the finger area which is detected in the step (2) except the group of the pixels which is detected in the step (5).

DETAILED DESCRIPTION OF THE PREFERRED EMBODIMENT OF THE PRESENT INVENTION

Figure 1:
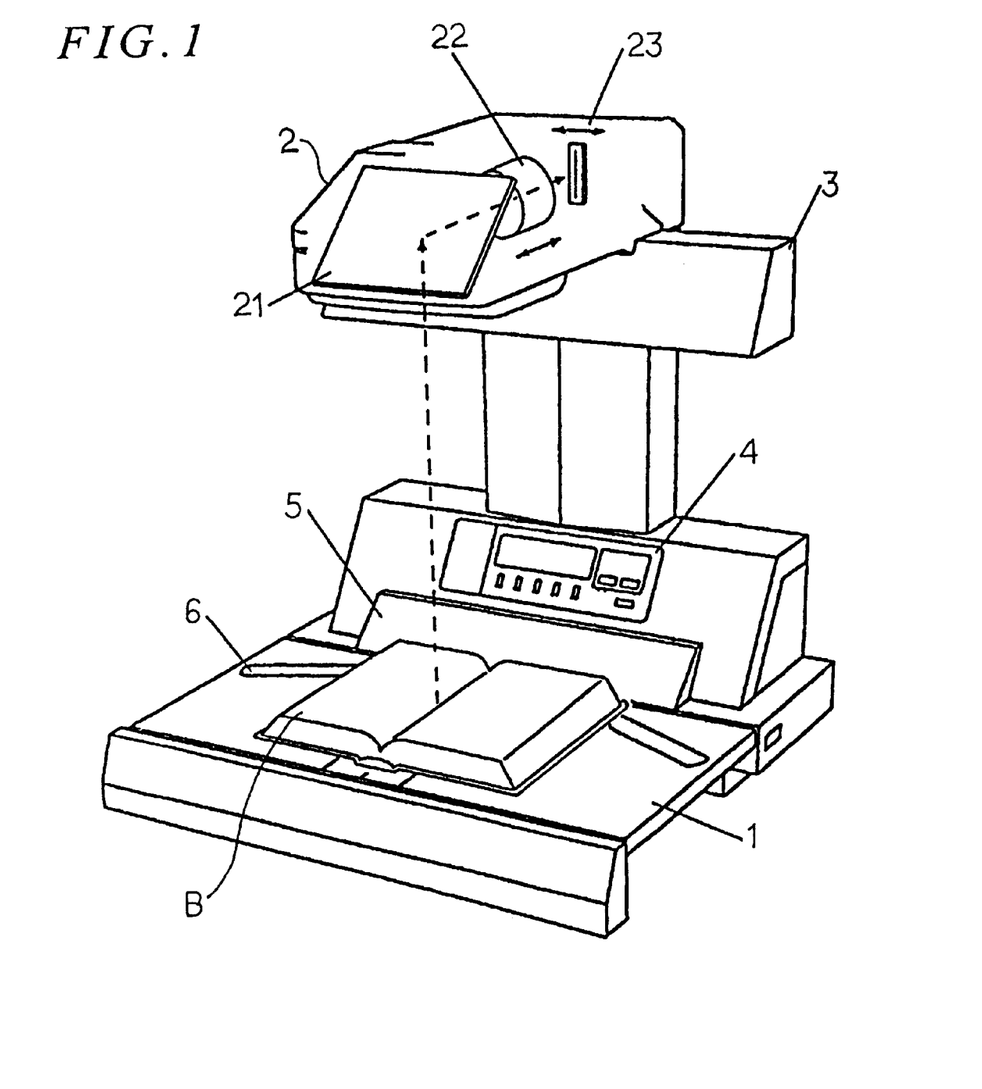
FIG. 1 is an external view of an image reading apparatus according to one embodiment of the present invention.

Now, the preferred embodiment of the present invention is explained with reference to accompanying drawings. In FIG. 1 showing an external view of an image reading apparatus of this embodiment, the apparatus comprises a document table 1 on which a thick document B such as a book or a file is opened and placed face up. The apparatus is equipped above the document table 1 with a camera head unit 2 which optically reads out an image of the document B, and an illuminator 3 which illuminates the document B. The camera head unit 2 comprises a reflection mirror 21, a photographing lens 22 and an image-pickup sensor 23 (image-pickup device). The image of the document B on the document table 1 which is illuminated by the illuminator 3, is reflected by the mirror 21 for changing the optical path, and projected onto the sensor 23, then read out by the sensor 23, and converted into the electrical signal. The sensor 23 is a line sensor in which light-receiving units are aligned. The sensor 23 (line sensor) runs in the right and left directions (sub-scanning direction) for scanning and reading out the two-dimensional image of the document. Also, the image reading apparatus comprises an operation unit 4 and a distance-measuring mirror 5 in the back of the document table 1. The operation unit 4 sets up each of modes and displays states of the apparatus such as error, alarm and the like. The distance-measuring mirror 5 is a reflection mirror for detecting a document height. Further, the apparatus has a start key 6 on the document table 1. Pressing the start key 6 starts reading out the document image.

Figure 2:
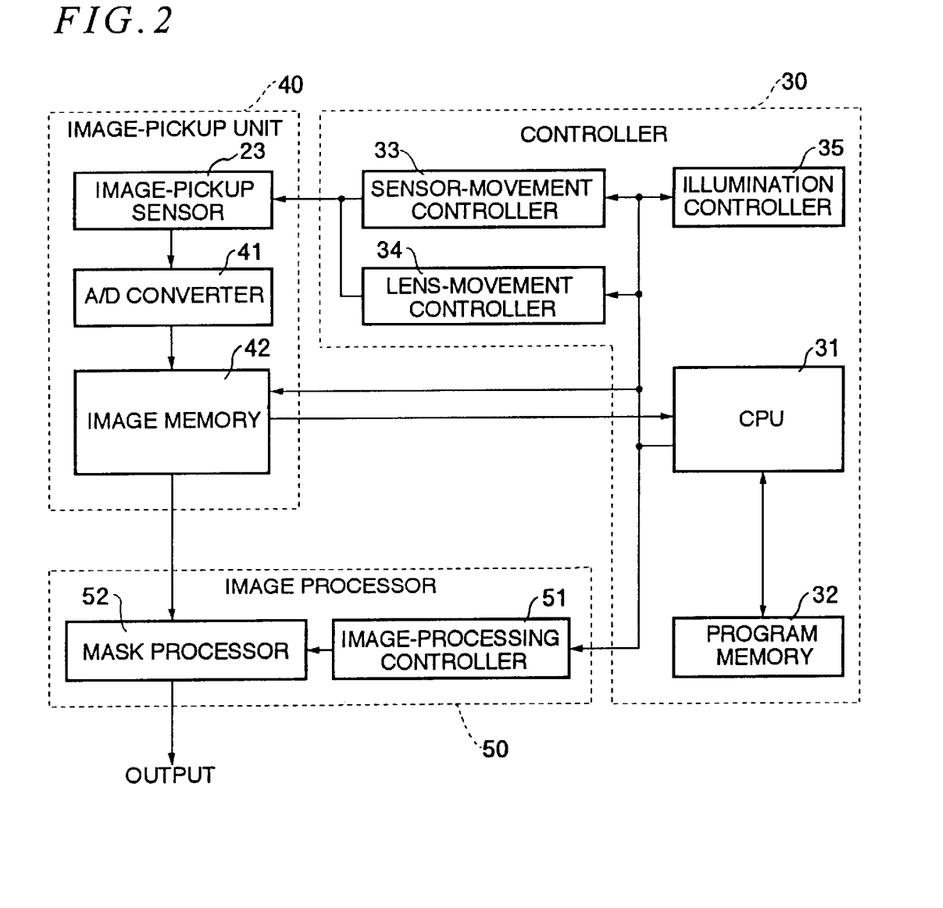
FIG. 2 is a circuit block diagram of the image reading apparatus.

FIG. 2 is a circuit block diagram of the image reading apparatus according to the present embodiment of this invention. This circuit has a controller 30, an image-pickup unit 40 and an image processor 50. The controller 30 includes various circuits for controlling the apparatus, and includes a memory. The image-pickup unit 40 carries out image reading. The image processor 50 processes the image data which is read out. The controller 30 comprises a CPU (central processing unit) 31, a program memory 32, a sensor-movement controller 33, a lens-movement controller 34 and an illumination controller 35. The CPU 31 controls the entire action of the apparatus and carries out various computations. The program memory 32 stores various kinds of control program. The sensor-movement controller 33 controls the movement of the sensor 23. The lens-movement controller 34 focuses the photographing lens 22. The illumination controller 35 controls the illuminator 3. The image-pickup unit 40 contains an A/D (analog to digital) converter 41 and an image memory 42. The A/D converter 41 converts the image data which is read out by the sensor 23, into the digital data. The image memory 42 stores the image data which has been converted into the digital data by the A/D converter 41. The image processor 50 comprises an image-processing controller 51 and a mask processor 52. The image-processing controller 51 controls various kinds of image-correction processing, and the mask processor 52 subjects the read-out image to a processing for erasing unwanted parts.

Figure 3:
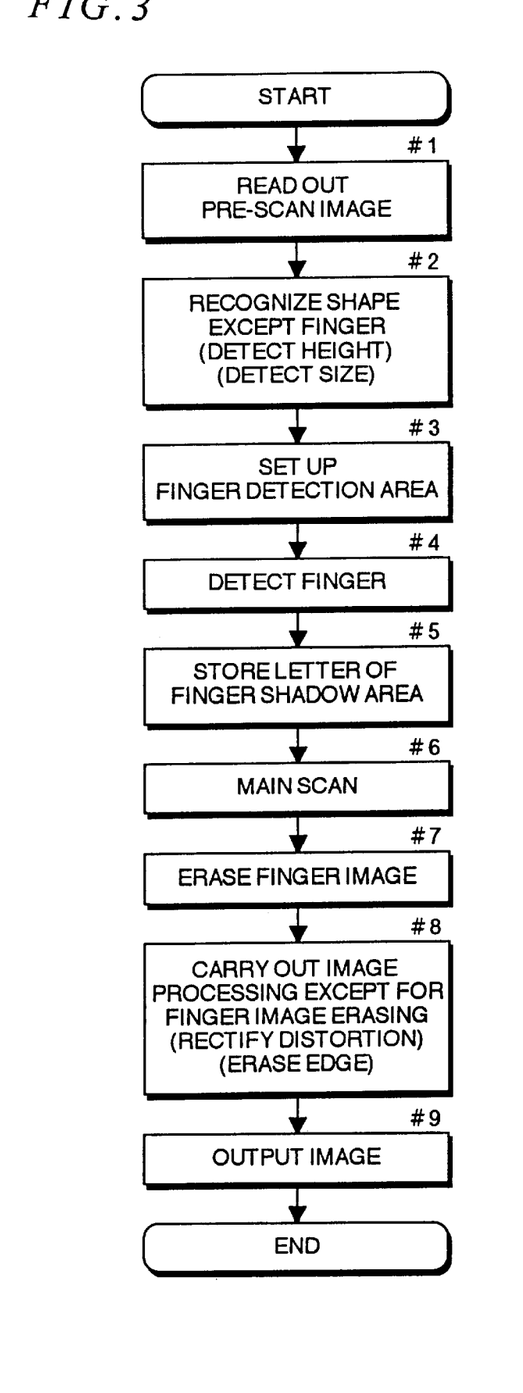
FIG. 3 is a flowchart explaining an entire processing in the image reading apparatus.
Figure 4:
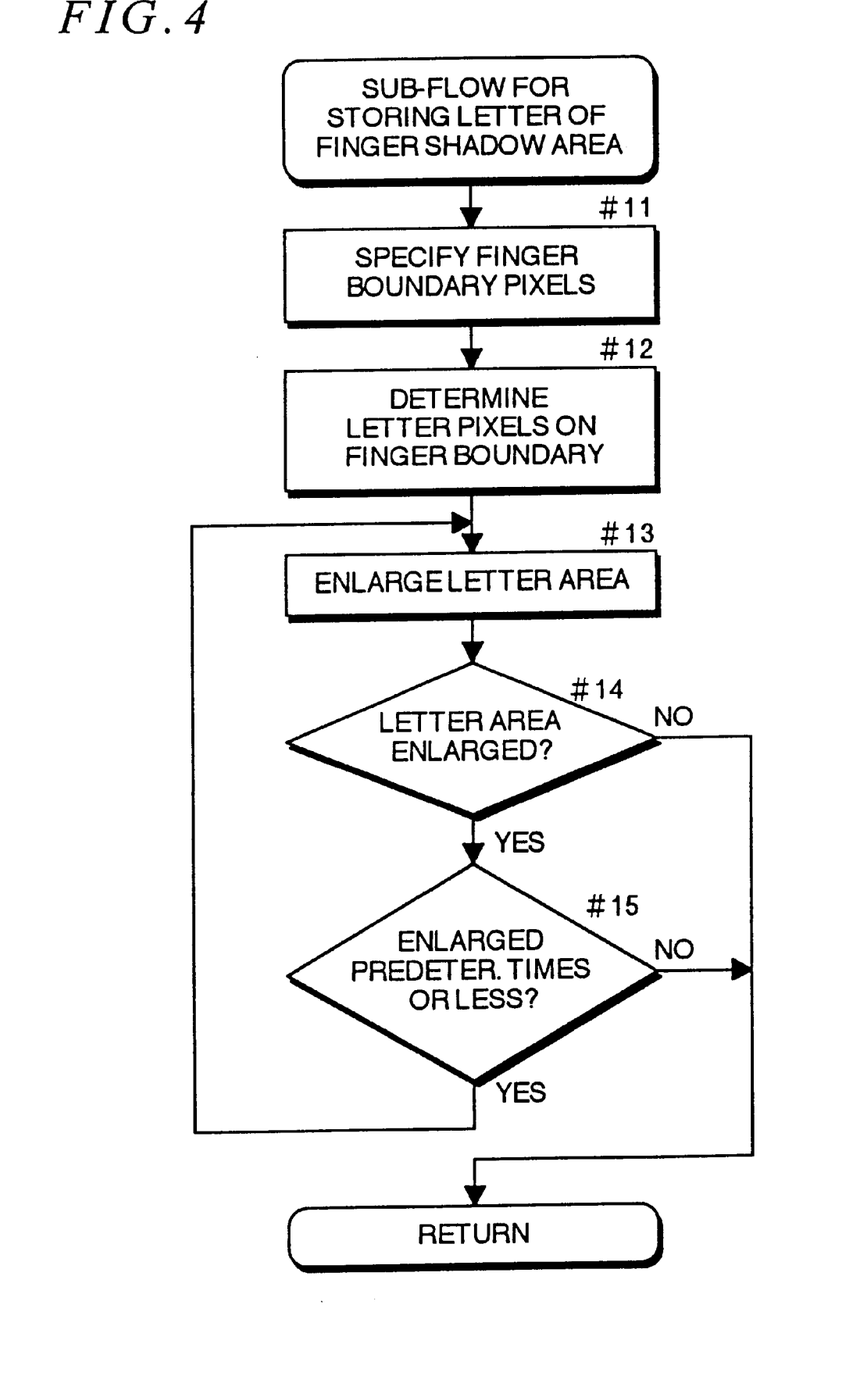
FIG. 4 is a flowchart explaining a detailed processing for storing a letter of a finger-shadow area.

FIG. 3 is a flowchart explaining an entire processing in the image reading apparatus. When the start key 6 is depressed, the CPU 31 starts a pre-scan processing, turns on the illuminator 3, and makes the sensor 23 run right and left for reading out the pre-scan image of the document (#1). Then, the image data which is read out in the step #1, is converted into the digital data by the A/D converter 41, following which, the data is stored into the image memory 42 as the pre-scan image data. The CPU 31 carries out a processing for detecting the document height and the document size (area which is enclosed by upper and lower edges, and right and left edges of the document) which means a processing for recognizing a shape except a finger (#2). After that, the CPU 31 sets up a finger detection area (area in which a finger is probably placed. e.g., this may be assumed to be the area 5 cm away from the right and left edges toward the central part of the document) in the pre-scan image based on the detected document size (#3). The finger is detected within the finger detection area (#4). In this finger detecting operation of the step #4, the letter of a finger-shadow area is detected as the finger area. For this reason, the letter of the finger-shadow area is distinguished and isolated from the finger area, and stored in order not to be erased as the finger area (in the step #5, detail will be later-explained with reference to FIG. 6).

For the next step, while executing the auto focusing of the photographing lens 22 using the result of the height detection of the document, and executing AE (automatic exposure) using the result of preparation to the auto exposure, the CPU 31 carries out a main-scan in the sensor 23 for reading out the whole image data (#6). The image data is converted into the digital data by the A/D converter 41, and stored into the image memory 42 as the image data to be output. Next, the CPU 31 specifies the main-scan image data into the mask processor 52 of the image processor 50. At the same time, the CPU 31 specifies positions of the area where pixels composing the letter of the finger-shadow area to be stored in the step #5 are excluded from the finger area which is detected in finger detecting operation in the step #4. The mask processor 52 erases the finger image by changing output values of the pixels in the specified positions into output values of the pixels of a ground in close to the specified positions (#7). After that, the CPU 31 carries out the image processing (e.g., distortion rectification, boundary erasure) except for finger image-erasure operation (#8), and outputs the image into a printer or a computer (#9), then, the processing is terminated.

Figure 5:
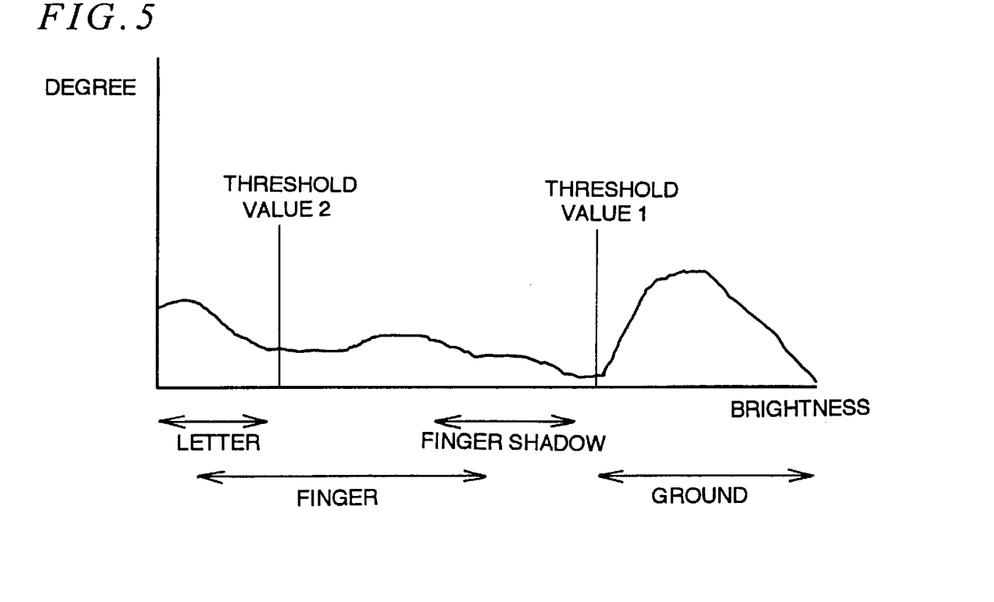
FIG. 5 is a view showing a brightness distribution in a pre-scanning image.

Next, a procedure for storing the letter of the finger-shadow area will be described referring to FIGS. 4 to 8. First of all, a principle of storing a letter of the finger-shadow area will be explained with reference to FIGS. 5 and 6. As shown in FIG. 5, a brightness in a pre-scan image is lowest in the letter areas, and becomes higher in order of the finger, shadow of the finger, and ground of the document. In the finger detecting operation, the area having a lower brightness than the document ground is assumed to be the finger area (threshold value 1 or less). The brightness of the letter overlaps with the lower brightness part of the finger area, and takes the lower value than it (i.e., threshold value 2 or less). Also, the CPU 31 carries out a processing for excluding small image patterns out of the finger area in order not to detect noises, letters, ruled lines as the finger area.

Figure 6:
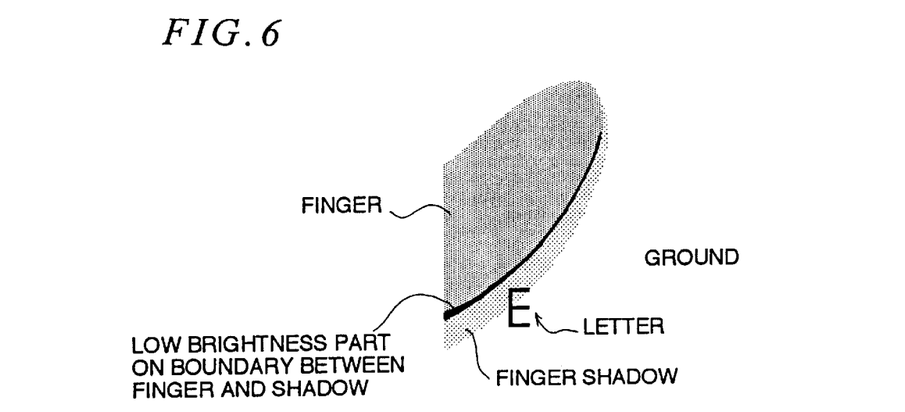
FIG. 6 is a view showing a finger and a periphery thereof in the pre-scanning image.

As to the letter detection in the shadow of the finger, the finger-shadow area has comparatively higher brightness, which makes difference from the letter area having lower brightness. Accordingly, the letter area can be distinguished and isolated from the finger-shadow area based on the threshold value 2. At the same time, as shown in FIG. 6, there exists the low-brightness part around the finger and shadow of the finger, which overlaps with the brightness of the letter area. For this reason, if all of the area having the brightness of the threshold value 2 or less are excluded from the finger area, the low-brightness area around the boundary is not detected as the finger area. To solve this problem, letter-brightness pixels on the boundary between the finger or finger-shadow area and the document ground are linked with letter-brightness pixels in close to the said letter-brightness pixels by a widely-known area-enlargement method and the like for enlarging the letter area in the finger-shadow area, thereby detecting the letter area of the finger-shadow area, and excluding it from the finger area.

Figure 7:
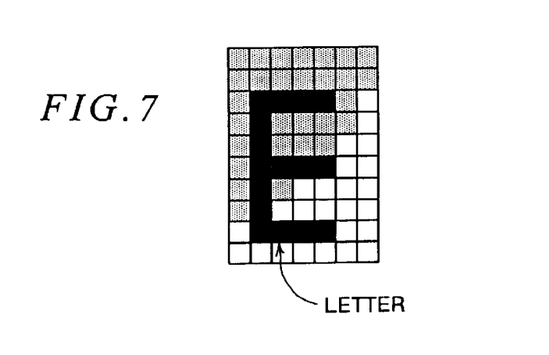
FIG. 7 is an enlarged view of the letter and the periphery thereof in FIG. 6.
Figure 8A:
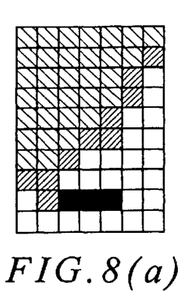
FIGS. 8(a)–8(h) are views explaining a processing for enlarging a letter area in the finger-shadow area.
Figure 8B:
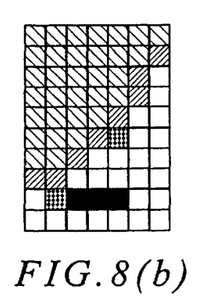
Figure 8C:
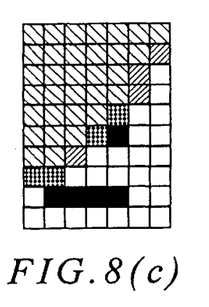
Figure 8D:
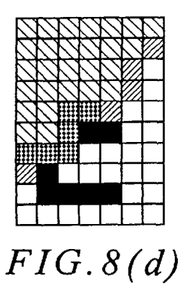
Figure 8E:
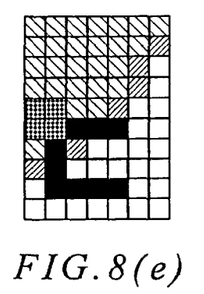
Figure 8F:
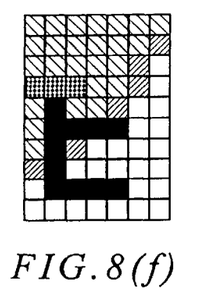
Figure 8G:
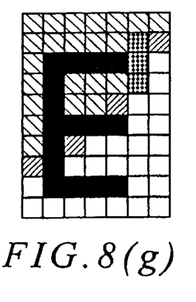
Figure 8H:
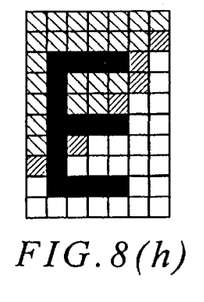

The explanation will be nextly given to a procedure for enlarging the letter area which is the main point in the procedure for storing the letter of the finger-shadow area with reference to FIGS. 4, 7 and 8(a)–(h). Edges of the area detected as the finger area which is shown by the shaded area in FIG. 7, are specified as the finger-boundary pixels (#11 in FIG. 4). At the same time, from among the finger area pixels, pixels around which there exist non-finger area pixels, are assumed to be finger-boundary pixels as shown in FIG. 8(a). After that, among the finger-boundary pixels, pixels having threshold value 2 or less are considered to be pixels of a letter, by which, letter pixels in the finger boundary are determined (refer to enlargement-target pixels in FIG. 8(b)), and assumed to be the letter area pixels (#12). Then, as shown in FIG. 8(c), in a condition of considering the finger area pixels around the letter area pixels (assumed in the step #12) to be the enlargement-target pixels, a letter area enlargement processing is carried out to determine the pixels having threshold value 2 or less as new letter area pixels in the enlargement-target pixels, using the widely-known area enlargement method (#13). In the pixel-enlargement processing, if the letter area is enlarged (YES in #14), and if the number of the enlargement processing is the predetermined times or less (YES in #15), from among the finger-area pixels around the newly-determined letter area pixels, the pixels which have not been the enlargement-target pixels, are considered to be enlargement-target pixels, and the letter area enlargement processing is repeatedly carried out for determining pixels having threshold value 2 or less as new letter area pixels, as shown in FIGS. 8(d)–8(f). Further, as shown in the enlargement processing in FIGS. 8(g) through 8(h), if the letter area is not enlarged (NO in #14) since there exist no pixels which have the threshold value 2 or less from among the enlargement-target pixels, or if the number of the enlargement processing exceeds the predetermined times (NO in #15), the enlargement processing quits repeating for terminating the procedure. It is because that no letter area is enlarged, means the conclusion of detecting a letter around the finger boundary in the finger-shadow area. Consequently, no further enlargement processing needs to be carried out. Also, that the number of the enlargement processing exceeds the predetermined times, indicates the high possibility that the pixels having the lower brightness on the boundary between the finger and finger shadow, or the image patterns of the large area such as an illustration, have already been linked with the letter area pixels. In such a case, the enlargement processing needs to be quit.

As described above, in the image reading apparatus of the present embodiment, starting at the letter-brightness pixels on the boundary of the finger area, and repeatedly linking the letter-brightness pixels with letter-brightness pixels in close to the said letter-brightness pixels, thereby, the image reading apparatus detects the pixels which compose a letter lying into the finger-shadow area from the boundary of the finger area, and erases the area except the pixels which compose the letter. This construction prevents the letter image lying into the finger-shadow area of the finger area from being erased in the image erasure operation for the finger area.

The present invention is not limited to the above-described embodiment, but includes varied or modified embodiments from the above. In the above-described embodiment, pixels composing the edges of the detected finger area are considered to be finger boundary pixels; in such a condition, starting at the finger boundary pixels, the apparatus detects the pixels which compose a letter lying into the finger-shadow area from the boundary of the finger area. However, it is also possible to make a structure in which the finger image erasure-target area including the marginal part is specified based on the result of the document size detection, and the pixels composing the edges of the finger image erasure-target area are considered to be the finger boundary pixels; in such a condition, starting at the finger boundary pixels, the apparatus detects the letter area pixels which lie into the finger-shadow area from the boundary of the finger area. This construction makes it possible to prevent a letter image lying into the marginal part from being erased in the image erasure operation in the finger image erasure-target area. Further although the number of the enlargement processing of the letter area is limited in the above-described embodiment, it is possible to make a structure in which the extent of the enlargement-target pixels is also limited, and determined in response to a distance from the finger boundary. This construction makes it sure to avoid linking non-letter image pixels with the letter area pixels. Furthermore, although the above embodiment describes an example of reading out a thick document such as a book or a file, it is to be noted that the present invention can be applied to every situation in which a finger may be placed on the document. Therefore, the present invention can be certainly applied even to the case of reading out a document in a sheet form.

What is claimed is:

1. An image reading apparatus for reading images from above a document table upon which a document is placed in a state that a surface having an image to be read faces upwardly, said image reading apparatus comprising:
   a reading unit which reads the image of the document to obtain image data; and
   a processor which carries out a process having the steps of:
   detecting a finger area which corresponds with a finger and a shadow of the finger on the document, out of the image data which are obtained by said reading unit;
   detecting pixels on a boundary of the thus detected finger area;
   detecting pixels having a brightness which corresponds with a letter from among the thus detected pixels on the boundary of the finger area;
   detecting a group of the pixels which corresponds with the letter in the finger area by starting at the thus detected pixels which correspond with the letter, and repeatedly linking the thus detected pixels with pixels having the brightness which corresponds with the letter from among pixels close to the thus detected pixels in the finger area; and
   subjecting the image data which are obtained by said reading unit to a process for erasing the finger area except for the thus detected group of the pixels.

2. An apparatus according to claim 1, wherein the processor terminates linking of pixels when linking of pixels is carried out more than a predetermined limitation.

3. An apparatus according to claim 2, wherein said predetermined limitation is a predetermined number of linkings.

4. An apparatus according to claim 1, wherein the processor erases the finger area except the thus detected group of the pixels by changing an output value of pixels which correspond with the area except the thus detected group of pixels from the finger area into an output value of pixels which correspond with a background of the document to be read.

5. A method of data processing for reading images from above a document table upon which a document is placed in a state that a surface having an image to be read faces upwardly, said method of data processing comprising:
   (1) a step of obtaining image data by reading an image of the document;
   (2) a step of detecting a finger area which corresponds with a finger and a shadow of the finger on the document out of the image data which are obtained in the step (1);
   (3) a step of detecting pixels on a boundary of the finger area which is detected in the step (2);
   (4) a step of detecting pixels having a brightness which corresponds with a letter from among the pixels on the boundary of the finger area which are detected in the step (3);

(5) a step of detecting a group of the pixels which corresponds with the letter in the finger area by starting at the pixels detected in the step (4) which correspond with the letter, and repeatedly linking the thus detected pixels with pixels having the brightness which corresponds with the letter from among pixels close to the thus detected pixels in the finger area;

(6) a step of obtaining image data by reading the image of the document once more; and (7) a step of subjecting the image data which are obtained in the step (6) to a processing for erasing the finger area which is detected in the step (2) for the group of the pixels which is detected in the step (5).

6. A method according to claim 5, wherein the step (5) comprises:

(5-1) a step of specifying pixels in the finger area adjacent to the pixels corresponding with a letter which are detected in the step (4);

(5-2) a step of detecting pixels having a brightness which correspond with the letter from among the pixels which are specified in the step (5-1);

(5-3) a step of specifying pixels in the finger area adjacent to the pixels corresponding with the letter which are detected in the step (5-2);

(5-4) a step of detecting pixels having the brightness which correspond with the letter from among the pixels which are specified in the step (5-3); and, (5-5) a step of detecting a group of pixels which corresponds with the letter in the finger area by repeating processing from the step (5-3) through the step (5-4) until no further pixel having the brightness which corresponds with the letter is detected.

7. A method according to claim 6, wherein, after the processing from the step (5-3) through the step (5-4) is repeated a predetermined number of times, the processing is terminated.

8. A method according to claim 5, wherein the finger area except for the thus detected group of the pixels is erased in the step (7) by changing an output value of pixels which correspond with the area except for the thus detected group of pixels from the finger area into an output value of pixels which correspond with a background of the document to be read.

9. An image reading apparatus for reading images from above a document table upon which a document is placed in a state that a surface having an image to be read faces upwardly, said image reading apparatus comprising:

a reading unit which reads the image of the document to obtain image data;

a letter detector which detects a finger area corresponding with a finger and a shadow of the finger on the document out of the image data obtained by said reading unit, and detects a group of the pixels which corresponds with a letter based on a brightness, from among the pixels in the thus detected finger area; and a mask processor which subjects the image data obtained by said reading unit to a processing for erasing the thus detected finger area except for the thus detected group of the pixels.

10. An apparatus according to claim 9, wherein the letter detector detects the group of pixels which corresponds with the letter from among the pixels in the finger area by carrying out the processing of:

detecting pixels on a boundary of the finger area;

detecting pixels having a brightness which corresponds with the letter from among the thus detected pixels on the boundary of the finger area; and detecting a group of the pixels which corresponds with the letter in the finger area by starting at the thus detected pixels which correspond with the letter, and repeatedly linking the thus detected pixels with pixels having the brightness which corresponds with the letter from among pixels close to the thus detected pixels in the finger area.

11. An apparatus according to claim 10, wherein the letter detector terminates linking of pixels when linking of pixels is carried out more than the predetermined limitation.

12. An apparatus according to claim 11, wherein said predetermined limitation is a predetermined number of linkings.

13. An apparatus according to claim 9, wherein said mask processor erases the finger area except for the above-detected group of the pixels by changing an output value of pixels which correspond with the finger area except for the thus detected group of pixels from the finger area into an output value of pixels which correspond with a background of the document to be read.

14. An image reading apparatus for reading images from above a document table upon which a document is placed in a state that a surface having an image to be read faces upwardly, said image reading apparatus comprising:

a reading unit which reads the image of the document to obtain image data; and a processor which carries out a process having the steps of:

detecting an object area, which corresponds with an object and a shadow of the object on the document, out of the image data which are obtained by said reading unit;

detecting pixels on a boundary of the thus detected object area;

detecting pixels having a brightness which corresponds with a letter from among the thus detected pixels on the boundary of the object area;

detecting a group of the pixels which corresponds with the letter in the object area by starting at the thus detected pixels which correspond with the letter, and repeatedly linking the above-detected pixels with pixels having the brightness which corresponds with the letter from among pixels close to the thus detected pixels in the object area; and subjecting the image data which are obtained by said reading unit to a process for erasing the object area except for the thus detected group of the pixels.

15. A method of data processing in an image reading apparatus for reading images from above a document table upon which a document is placed in a state that a surface having an image to be read faces upwardly, said method of data processing comprising the steps of:

(1) obtaining image data by reading an image of the document;

(2) detecting an object area which corresponds with an object and a shadow of the object on the document out of the image data which are obtained in the step (1);

(3) detecting pixels on a boundary of the object area which is detected in step (2);

(4) detecting pixels having a brightness which corresponds with a letter from among the pixels on the boundary of the object area which are detected in step (3);

(5) detecting a group of the pixels which corresponds with the letter in the object area by starting at the pixels detected in step (4) which correspond with the letter, and repeatedly linking the thus detected pixels with pixels having the brightness which corresponds with the letter from among pixels close to the thus detected pixels in the object area;

(6) obtaining image data by reading the image of the document once more; and (7) subjecting the image data which are obtained in step (6) to a process for erasing the object area which is detected in step (2) except for the group of the pixels which is detected in step (5).

16. An image reading apparatus for reading images from above a document table upon which a document is placed in a state that a surface having an image to be read faces upwardly, said image reading apparatus comprising:

a reading unit which reads the image of the document to obtain image data;

a letter detector which detects an object area corresponding with an object and a shadow of the object on the document out of the image data obtained by said reading unit, and which detects a group of the pixels, which corresponds with a letter based on a brightness, from among the pixels in the thus detected object area; and a mask processor which subjects the image data obtained by said reading unit to a processing for erasing the thus detected object area except for the thus detected group of the pixels.

* * * * *